(12) United States Patent
Dahl et al.

(10) Patent No.: US 10,106,405 B2
(45) Date of Patent: Oct. 23, 2018

(54) PROCESS FOR HEATING AN ATR

(71) Applicant: Haldor Topsøe A/S, Kgs. Lyngby (DK)

(72) Inventors: Per Juul Dahl, Vedbæk (DK); Thomas Sandahl Christensen, Kgs. Lyngby (DK)

(73) Assignee: Haldor Topsoe A/S, Lyngby (DK)

( * ) Notice: Subject to any disclaimer, the term of this patent is extended or adjusted under 35 U.S.C. 154(b) by 0 days.

(21) Appl. No.: 15/117,002

(22) PCT Filed: Apr. 8, 2015

(86) PCT No.: PCT/EP2015/057641
§ 371 (c)(1),
(2) Date: Aug. 5, 2016

(87) PCT Pub. No.: WO2015/155256
PCT Pub. Date: Oct. 15, 2015

(65) Prior Publication Data
US 2016/0347612 A1    Dec. 1, 2016

(30) Foreign Application Priority Data

Apr. 8, 2014    (DK) .................................. 2014 00203

(51) Int. Cl.
*C01B 3/38* (2006.01)
*C01B 3/36* (2006.01)
*F27D 99/00* (2010.01)

(52) U.S. Cl.
CPC ................ *C01B 3/384* (2013.01); *C01B 3/36* (2013.01); *C01B 3/382* (2013.01); *F27D 99/0001* (2013.01); *C01B 2203/025* (2013.01); *C01B 2203/0244* (2013.01); *C01B 2203/0255* (2013.01); *C01B 2203/0283* (2013.01); *C01B 2203/0805* (2013.01); *C01B 2203/0816* (2013.01); *C01B 2203/0822* (2013.01); *C01B 2203/1241* (2013.01); *C01B 2203/1258* (2013.01); *C01B 2203/1604* (2013.01)

(58) Field of Classification Search
CPC .......... C01B 3/36; C01B 3/384; C01B 3/382; C01B 2203/0816; C01B 2203/0255; C01B 2203/0822; C01B 2203/1258; C01B 2203/0805; C01B 2203/1241; C01B 2203/0283; C01B 2203/0244; C01B 2203/025; C01B 2203/1604; F27D 99/0001
USPC ....................................... 432/4, 31
See application file for complete search history.

(56) References Cited

U.S. PATENT DOCUMENTS

| | | | |
|---|---|---|---|
| 2004/0057898 A1* | 3/2004 | Singh | B01J 8/067 423/652 |
| 2004/0081593 A1 | 4/2004 | Docter et al. | |
| 2007/0295937 A1* | 12/2007 | Fujie | C01B 3/382 252/373 |
| 2011/0085967 A1* | 4/2011 | Raybold | C01B 3/382 423/652 |
| 2012/0326090 A1* | 12/2012 | Han | B01J 8/062 252/372 |

FOREIGN PATENT DOCUMENTS

| | | |
|---|---|---|
| CN | 1323937 C | 7/2007 |
| EP | 0 936 182 A2 | 8/1999 |
| EP | 1 400 489 A1 | 3/2004 |
| WO | WO 2012/123100 A1 * | 9/2012 |
| WO | WO 2014/037201 A1 | 3/2014 |

* cited by examiner

*Primary Examiner* — Steven B McAllister
*Assistant Examiner* — Benjamin W Johnson
(74) *Attorney, Agent, or Firm* — Blank Rome LLP

(57) ABSTRACT

The present invention relates to a process for heating an ATR or POX comprising the steps of heating a process stream by at least one heating means, admitting the heated process stream to an ATR or POX reactor through a main burner, and heating the ATR or POX reactor to or above autoignition temperature of the process stream via the heated process stream.

11 Claims, No Drawings

PROCESS FOR HEATING AN ATR

BACKGROUND OF THE INVENTION

In known ATR or POX systems the reformer must be heated up to a sufficiently high temperature before the hydrocarbon and the oxygen containing feed can safely be admitted to allow autoignition of the combustible feedstream and allow flame propagation.

In traditional ATR reformers a dedicated start-up (SU) burner has been used to heat-up the ATR reactor to high temperature (i.e. 800-1000° C.), which is above the autoignition temperature at atmospheric pressure before introduction of the hydrocarbon containing feed stream and the oxygen containing feed stream. The dedicated SU burner must be removed and replaced by a main process burner before the feedstream is introduced. These known labour intensive work steps are demanding and time consuming as heavy equipment needs to be handled at very high temperatures. Furthermore in the known processes the connecting flanges must be ensured to be leak tight after the mounting which means that leak test must be carried out also in hot conditions after the main process burner has been mounted.

Thus there is a need for a new process enabling faster and more efficient start-up of ATR/POXs and similar reforming systems.

SUMMARY OF THE INVENTION

In a first aspect of the present invention is provided a process enabling a system and process wherein the dedicated start-up burner can be omitted In a second aspect of the present is provided a process which minimizes or even eliminates the change of equipment between the heating and ignition of the ATR In a third aspect of the present invention is provided a process which allows the ATR system to be leak tested in a safe manner in cold condition, These and other advantages are achieved by a process for heating an ATR or POX comprising the steps of
heating a process stream by at least one heating means,
admitting the heated process stream to an ATR or POX reactor through a main burner,
heating the ATR or POX reactor to or above autoignition temperature via the heated process stream. I.e. according to the present process the process stream is heated prior to being admitted to the ATR/POX reformer and is used to heat the ATR/POX reformer to a desired temperature.

The external heating of the process stream can comprise equipment such as tube-and-shell heat-exchanger, fired heater or similar.

In known systems where the ATR is heated by a start-up (SU) burner, the SU burner is removed when a desired temperature is achieved. After the SU burner is removed a main burner had to be installed and the system leak tested to make sure that the main burner is properly installed and the system leak tight. Due to the burner change over in known systems the temperature control at the time of ignition is also likely to be less than optimal as the temperature decrease as function of time from the time the SU burner is removed and the temperature may decrease below auto ignition temperature.

As the reactor according to the present process is heated by the process stream entering the reactor through the main burner no parts needs to be removed or changed between the step of heating the ATR and the step of igniting the flame. The process stream contain combustible components and may e.g. be a hydrocarbon feed, hydrocarbon (such as natural gas) and steam mixture, hydrocarbon and steam mixture which has been partial converted in a low temperature reformer, which could be adiabatic, a mixture of hydrocarbons and hydrogen, a hydrogen containing stream or a methanol containing stream. Any of the above process streams could contain a mixture of the combustible components and steam and/or $CO_2$.

The fact that the burner and/or other parts does not need to be changed when proceeding from heating to ignition means that the system can be leak tested under safe and less demanding conditions as it can be done before the heating of the system is initiated.

Also the ignition by the present process can be performed at highly controlled parameters e.g. at a specific temperature as there is no change over of burner and/or of the gas used for heating the reactor.

Before ignition preferably no oxygen is flowing as well as the process stream may be flowing isothermally through the combustion chamber as no reaction is taking place as no oxygen is admitted.

According to desired embodiments of the present invention no premixing of combustibles and oxidant is taking place before introduction into the ATR through the main burner.

POX refers to systems where a hydrocarbon feed is combusted together with $O_2$ via a burner in a reactor at fuel-rich conditions leading to partial combustion of the hydrocarbons. ATR refers to systems where combustion e.g. as described for the POX is combined with a catalytically reforming i.e. where partial oxidation is followed by a catalytic steam reforming over a steam reforming catalyst.

The autoignition temperatures may be dependent on a number of parameters, which include but are not limited to the steam/carbon ratio (mole $H_2O$/mole C atoms), the content of higher hydrocarbon in the feed gas, the $CO_2$ and $H_2$ content in the feed gas, the content of methanol or other oxygenates in the feed gas, the residence time and/or the operating pressure in the reactor.

Further the autoignition temperature can be dependent on the ratio between oxygen and the hydrocarbon containing feedstream (process stream) when an oxygen feed is admitted to the reactor for mixing with the hydrocarbon containing stream to establish the flame.

If the process stream is heated in a fired heater and/or heat exchanger and the higher hydrocarbons are converted by means of prereformer several advantages is achieved as the effluent gas from the prereformer can be further heated to high temperature before the ATR reformer. In the prereformer higher hydrocarbons can be removed which changes the limitations on e.g. the temperature range the process stream i.e. the prereformer effluent can be heated to. Thus with the prereformer it is possible to heat the process stream to higher temperatures without formation of coke or carbon caused by higher hydrocarbons.

In the present context higher hydrocarbons are $C_nH_m$ where $n \geq 2$, $m \geq 4$.

The process stream may preferably comprise less than 20% $H_2$, such as less than 15% $H_2$ or less than 10% $H_2$. For example a process stream which has been prereformed may comprise less than 20% $H_2$, but usually more than 5% $H_2$, such as 5-15% $H_2$. % $H_2$ is dry mole %, i.e. excl steam partial pressure.

The applicant surprisingly has shown that, depending on various factors, more $H_2$ is not necessarily preferred in order to achieve optimized ignition. For example it may be preferred to use a process stream comprising less than 10% $H_2$ such as less than 5% $H_2$ when the process stream further comprises a natural gas (NG) with higher hydrocarbons.

It has for example been shown that it is possible to achieve autoignition of a natural gas which has been desulfurized and thus comprises 2-3% $H_2$ (added for the desulfurization step) and C1-C5 hydrocarbons which for example is the case if the process stream is not prereformed before admission into the ATR/PDX.

In preferred embodiments according to the present application no direct recycle from the ATR effluent to the process stream is used before or during ignition whereby a simple process setup is achieved. A process without a direct recycle from ATR effluent to the process stream may also result in a relatively low $H_2$ concentration in the process stream, such as a $H_2$ concentration below 20% e.g. below 10% or below 5% $H_2$.

In various embodiments the process stream is heated to a temperature of 300 to 650° C., preferably over 400° C., for example 450-600° C. or 530-580° C.

By the heated process stream the ATR or POX reactor is heated to a temperature above 300° C. such as above 450° C. where some preferred embodiments can be achieved. The ATR/POX may thus be heated to temperatures in the range 300 to 650° C., for example in the range of 450-600° C., 530-580° C. or e.g. 470-550° C. in order to obtain conditions for optimal ignition.

The applicant has shown that ignition of the PDX/ATR burner at elevated pressure preferably in the above mentioned temperature ranges results in a significantly reduced soot formation.

The pressure in the ATR or POX reactor can advantageously be increased to 1-80 bar, such as at least 10 bar, 12-30 bar or 15-25 bar at the time of ignition. After ignition the pressure may be elevated to operational pressure. If ignition is carried out at 15-25 bar the operational pressure may e.g. be in the range of 25-50 bar.

The present method can advantageously be carried out in a plant comprising a prereformer and means for heating the process stream to the desired temperatures. The plant furthermore may comprise the ATR/POX reformer with burner and means for admitting the process stream and oxygen preferably through the main burner.

In some embodiments the PDX/ATR reformer can be heated to 575° C. where after ignition is carried out at a pressure of 20 bar. When the ignition is ensured the pressure is raised and the temperature will rise to operation temperature. By these ignition parameters (575° C., 20 bar) the temperature/pressure is outside the curve of soot formation when ignition occurs which means that the system is not taken through a stage with heavy soot formation as the temperature/pressure is risen to reach operation conditions.

Thus according to the present invention parameters within the disclosed temperature ranges preferably of 450-600° C. and at the elevated pressure ranges may be chosen in order to avoid soot formation during ignition and transition to operation conditions.

According to the present method the process stream admitted through the main burner can be ignited by admitting $O_2$ via the main burner. This way the process stream and $O_2$ can be fed to the reformer under controlled conditions. I.e. the ratio between process stream and $O_2$ can be controlled as well as the flow pattern and mixing of the streams admitted through the burner can be controlled.

In the ATR/POX reformer hydrocarbon feed is preferably processed by under-stoichiometric homogeneous combustion (or fuel rich combustion) to syngas in a combustion chamber. Further conversion to syngas takes place by catalytic steam reforming reactions in a fixed bed catalyst bed.

In the present process the Oxygen/hydrocarbon ratio in the ATR or POX reactor is advantageously 0.05-0.30 $Nm/Nm^3$ such as 0.1-0.25 at ignition and 0.50-0.70 such as approximately 0.60 during operation. The feed ratio between oxygen and hydrocarbon feed stream flows is calculated before addition of steam streams. So Oxygen feed flow (Nm3/hr) is before additional burner steam is added and hydrocarbon feed flow is the flow of the hydrocarbon feed flow (Nm3/hr) before feed steam is mixed with the hydrocarbon feed to form the process stream. The hydrocarbon feed can typical be a natural gas after a desulphurization step.

If the ATR is ignited at an Ox/hydrocarbon ratio of 0.5-0.7 $Nm/Nm^3$ the temperature increase (heat of reaction) will be several hundred degree C. and the temperature in the ATR reactor combustion chamber will rise from 600° C. to 1300-1400° C. in short time (within minutes). This will give a rapid temperature gradient on the refractory lining. If ignition is carried out at Ox/hydrocarbon of 0.05-0.30 the temperature increase will be limited and the stress on reactor walls and other hard ware can be reduced compared to ignition at operation ratio (0.50-0.70).

The ignition temperature may depend on the Ox/hydrocarbon ratio. As Ox/hydrocarbon ratio is increased ignition temperature is decreased. This means that ignition at e.g. 0.1 Ox/hydrocarbon ratio is more difficult to obtain than ignition at 0.2. However, the applicant has shown that the advantages of igniting at a lower Ox/hydrocarbon ratio than traditionally used outweigh the disadvantages.

The ATR or POX reactor can also be partly preheated by an inert gas if desired in special setups.

Used process streams may for example comprise desulfurized Natural gas and/or prereformed natural gas.

The composition of the natural gas (NG) may vary depending on its origin, but exemplary compositions (mole %) are given below for a standard NG and a heavy NG. Similarly light NG having a reduced heavy hydrocarbon content compared to the standard NG exists.

TABLE 1

|  | Standard NG | Heavy NG |
| --- | --- | --- |
| $N_2$ | 0.45 | 0.79 |
| $CO_2$ | 1.20 | 1.50 |
| $CH_4$ | 96.36 | 84.82 |
| $C_2H_6$ | 2.22 | 6.64 |
| $C_3H_8$ | 0.45 | 3.55 |
| $C_4H_{10}$ | 0.23 | 2.31 |
| C5 and C5+ | 0.08 | 0.91 |

Thus according to the present invention it is possible to use the normal process equipment which preferably include an adiabatic prereformer and a heater e.g. a fired heater (it could also be other type of preheaters for example shell and tube heat exchangers) to heat the process hydrocarbon feed stream to high temperatures and admit this stream to the ATR reformer through the main process burner with the purpose of heating the ATR reactor to above the autoignition temperature.

The applicant has shown that the autoignition temperature of the process streams e.g. hydrocarbon feed streams, like mixtures of natural gas and steam, under the right conditions has autoignition temperatures in substoichiometric or fuel rich conditions that are much lower than the ranges of 800-1000° C. which previously has been used.

Also it has been shown that the autoignition temperature is reduced when the pressure in the reformer is elevated during ignition. Furthermore the ignition of the flame in the ATR/POX at pressurized conditions and the fuel rich conditions applied during ignition at preferably 450-600° C. or more preferably 530-580° C. It has further been shown that mixtures auto ignited by this process at elevated pressure and temperature in range 300-600° C. and with a partial addition of oxygen will minimize the soot formation and other formation of organic hydrocarbons during the flame ignition and during the subsequent heat-up to normal operating temperatures at 1000-1300° C.

In summary the described process enables that the ATR/PDX process safely can be started up without a dedicated SU burner or other heating device by using the in-line process heater(s) to heat-up a feed gas containing combustible components directly in the heater. The heated process stream is used to heat the downstream ATR/POX reactor to above the autoignition temperature.

Also according to the invention we can apply the normal feed stream with combustible and avoid using special chemicals with low ignition point to initiate the flame propagation reactions. I.e. the present invention provides a method in which the start-up can be carried out with the actual hydrocarbon process stream without additives such as chemicals with low ignition point.

EXAMPLE

Start Up (SU) Without Dedicated SU Burner

In the present example an ATR unit consists of a system for providing feeds to the ATR reactor, a fired heater, a prereformer, the ATR reactor itself, and equipment for post-treatment of the product gas.

The streams consist of natural gas, steam oxygen and hydrogen. All gasses are compressed to the operating pressure and heated to the operating temperature. The natural gas is desulphurized before entering the ATR reactor.

In the tests the feeds were combined into two streams and were send to the burner of the ATR. The burner used in the example is described in U.S. Pat. No. 5,496,170, which by reference is included herein.

A first feed stream (process stream) contained natural gas, hydrogen and steam. This was heated to a variable temperature in the range 300 to 650° C.: A second feed stream contained oxygen and steam. The second stream was heated to approx. 200° C.

In the ATR reactor, the substoichiometric combustion and subsequent catalytic steam reforming and shift reactions are carried out. The inlet and exit gas compositions are measured by gas chromatograph.

The tests were successfully carried out to demonstrate that flame ignition can be obtained at low temperature with fuel rich conditions with the configuration described above.

In each test the feed stream composition or the operating conditions have been changed and it has been detected if ignition is obtained or not. The first stream I.e. the hydrocarbon containing stream is passing the ATR reactor continuously.

Before entering the ATR the hydrocarbon containing stream is mixed with steam and heated in a fired heater and then led to an adiabatic prereformer. Prereformer is optional and can be bypassed. The effluent stream from the prereformer is sent to a separate fired heater section and heated to a temperature in the range of 300-650° C.

The preheated mixture is sent to the ATR reformer and its burner. At the burner the hydrocarbon feed mixture may be mixed with a small steam flow which is used to cool the burner.

Before ignition no oxygen is flowing and the first stream i.e. the feed mixture (process stream) is flowing isothermally through the combustion chamber as no reaction is taking place as no oxygen is admitted.

The feed mixture is passing a catalyst bed in which adiabatic steam reforming is taking place and the temperature is decreasing as the steam reforming reactions are endothermic.

In the test an oxidant stream (mixture of pure 99% oxygen and saturated steam) is introduced to the burner periodically for short periods. Flame ignition is detected by temperature increase monitored by thermocouples. The feed mixture is in the present tests allowed to equilibrate for min 120 seconds. Flame ignition should be detected within this time period.

The test data is for a case with adiabatic prereformer and the test result show that at 15 bar g the autoignition is obtained for temperatures >475° C.

The applicant has furthermore shown that the ignition temperature decrease with increasing pressure and that the ignition temperature decrease with increased Oxygen/NG ratio.

TABLE 2

| Ox/NG ratio Nm³/Nm³ | S/C ratio Mole H₂O/mole C | Pressure bar g | Temperature ° C. | Ignition yes or no |
|---|---|---|---|---|
| 0.20 | 1.80 | 15.0 | 490 | Yes |
| 0.20 | 1.80 | 15.0 | 490 | Yes |
| 0.20 | 1.79 | 15.0 | 490 | Yes |
| 0.20 | 1.81 | 15.0 | 485 | Yes |
| 0.20 | 1.79 | 15.0 | 485 | Yes |
| 0.20 | 1.80 | 15.0 | 480 | Yes |
| 0.20 | 1.80 | 15.0 | 480 | Yes |
| 0.20 | 1.80 | 15.0 | 475 | Yes |
| 0.20 | 1.80 | 15.0 | 470 | No |
| 0.20 | 1.80 | 15.0 | 470 | No |
| 0.20 | 1.79 | 15.0 | 465 | No |
| 0.20 | 1.80 | 15.0 | 465 | No |

The invention claimed is:

1. A process for heating and igniting an ATR (autothermal reformer) or POX (partial oxidation reformer), said process comprising the steps of:
   heating a hydrocarbon containing process stream comprising less than 5% $H_2$ by at least one heating means to obtain a heated process stream comprising less than 5% $H_2$,
   admitting the heated process stream to an ATR or POX reactor through a main burner,
   heating the ATR or POX reactor to or above autoignition temperature of the process stream via the heated process stream,
   admitting an $O_2$ containing stream via the main burner at a first oxygen:hydrocarbon ratio to obtain autoignition and ignite the heated process stream in the reactor, and
   operating the ATR or POX reactor after autoignition at a temperature of between 1000° C.-1300° C. while admitting an $O_2$ containing stream via the main burner at a second oxygen:hydrocarbon ratio greater than the first oxygen:hydrocarbon ratio.

2. The process according to claim 1, wherein the hydrocarbon containing process stream is heated to a temperature of 450° C.-600° C.

3. The process according to claim 1, wherein the heated process stream is ignited at temperatures between 450° C.-600° C.

4. The process according to claim 1, wherein the ATR or POX reactor is heated to a temperature of 450° C.-600° C.

5. The process according to claim 1, wherein pressure in the ATR or POX reactor is 10-25 bar during ignition.

6. The process according to claim 1, wherein the first oxygen:hydrocarbon ratio in the ATR or POX reactor is 0.05-0.30 at ignition and the second oxygen:hydrocarbon ratio is 0.50-0.70 during operation.

7. The process according to claim 1, wherein the ATR or POX reactor is preheated by an inert gas.

8. The process according to claim 1, wherein the hydrocarbon containing process stream comprises a natural gas comprising C1-C5 hydrocarbons.

9. The process according to claim 1, wherein the hydrocarbon containing process stream comprises steam, 2%-3% $H_2$ and natural gas comprising $C_1$-$C_5$ hydrocarbons.

10. The process according to claim 1, wherein the hydrocarbon containing process stream is desulfurized before steam addition.

11. A plant arranged to carry out the process according to claim 1.

* * * * *